United States Patent
Lee et al.

(10) Patent No.: US 9,860,440 B2
(45) Date of Patent: Jan. 2, 2018

(54) POWER SAVING CONTROL METHOD AND ELECTRONIC DEVICE SUPPORTING THE SAME

(71) Applicant: Samsung Electronics Co., Ltd., Gyeonggi-do (KR)

(72) Inventors: Wooyong Lee, Seoul (KR); Kwangkyu Park, Gyeonggi-do (KR); Minho Kim, Gyeonggi-do (KR); Hyeonjae Bak, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/990,909

(22) Filed: Jan. 8, 2016

(65) Prior Publication Data
US 2016/0127640 A1 May 5, 2016

Related U.S. Application Data

(63) Continuation of application No. 13/961,075, filed on Aug. 7, 2013, now Pat. No. 9,264,608.

(30) Foreign Application Priority Data

Aug. 7, 2012 (KR) .................. 10-2012-0086419

(51) Int. Cl.
*H04N 5/232* (2006.01)
*G06F 1/32* (2006.01)

(52) U.S. Cl.
CPC ....... *H04N 5/23219* (2013.01); *G06F 1/3231* (2013.01); *H04N 5/23241* (2013.01); *H04N 5/23293* (2013.01)

(58) Field of Classification Search
None
See application file for complete search history.

(56) References Cited

U.S. PATENT DOCUMENTS

| 6,734,845 | B1 | 5/2004 | Nielsen et al. |
| 7,379,560 | B2 | 5/2008 | Bradski et al. |
| 8,913,004 | B1 | 12/2014 | Bozarth et al. |
| 2003/0052789 | A1 | 3/2003 | Colmenarez et al. |
| 2007/0126884 | A1 | 6/2007 | Xu et al. |

(Continued)

FOREIGN PATENT DOCUMENTS

| CN | 102239460 A | 11/2011 |
| CN | 102497469 A | 6/2012 |
| KR | 10-2005-0053163 A | 6/2005 |

OTHER PUBLICATIONS

European Search Report dated Oct. 17, 2016.
Chinese Search Report dated Jan. 22, 2017.

*Primary Examiner* — James Hannett
(74) *Attorney, Agent, or Firm* — Cha & Reiter, LLC.

(57) ABSTRACT

A control for a power saving of an electronic device is disclosed. The device includes a camera configured to be activated and then obtain an image when no input event is received within a given time after activation of a selected function. The device further includes a control unit configured to, if the obtained image contains a specific pattern, determine whether the specific pattern corresponds to a human face pattern, and to, if the specific pattern does not correspond to the human face pattern, perform a power saving control of the electronic device.

20 Claims, 6 Drawing Sheets

(56) References Cited

U.S. PATENT DOCUMENTS

2009/0082066 A1    3/2009  Katz
2010/0079508 A1    4/2010  Hodge et al.
2010/0125816 A1    5/2010  Bezos
2014/0160016 A1*   6/2014  Katz .................... G06F 1/3203
                                                    345/156

* cited by examiner

FIG. 5
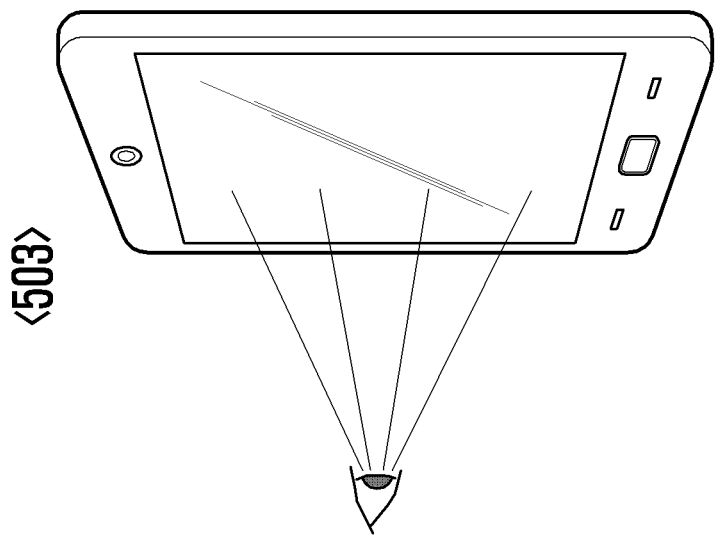
Nsec
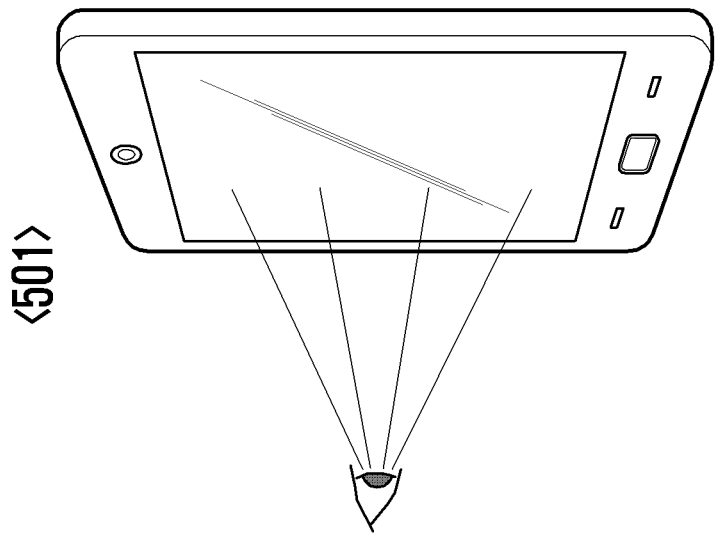

FIG. 6
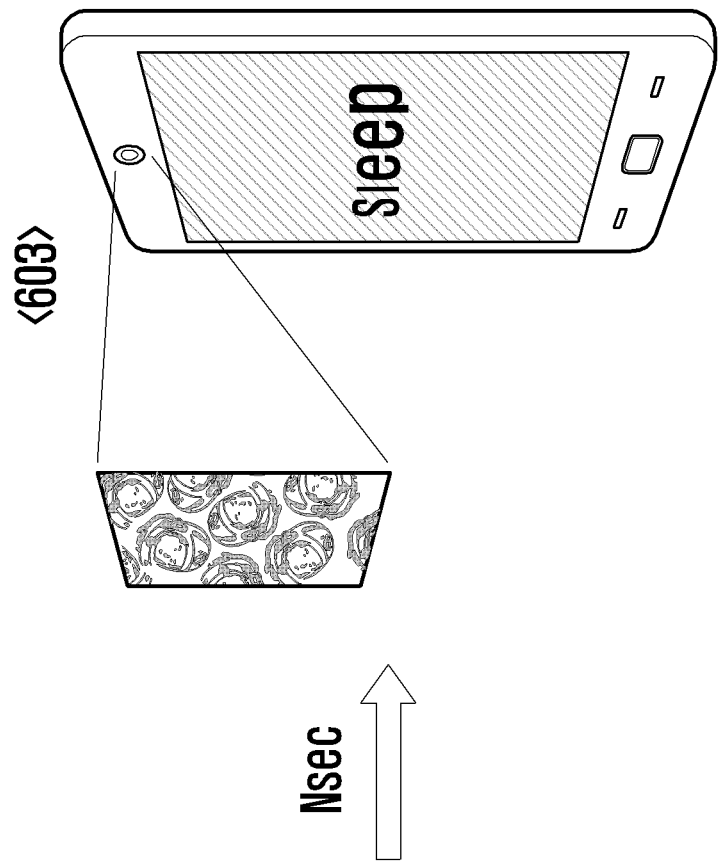
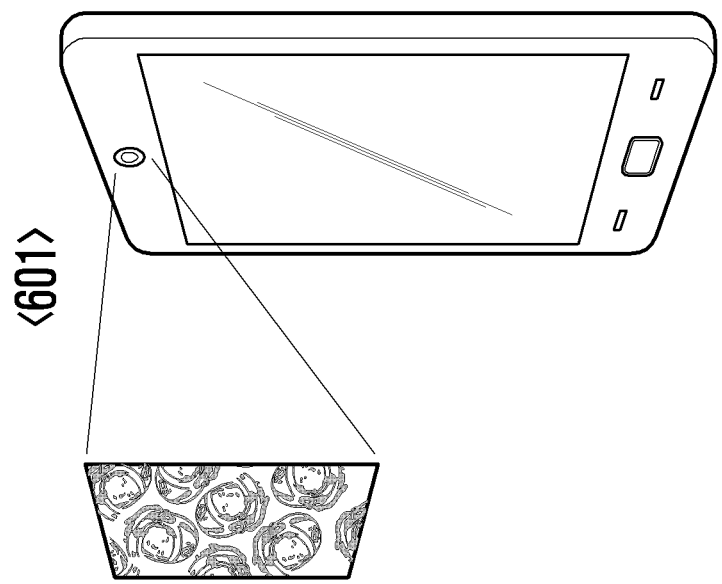

POWER SAVING CONTROL METHOD AND ELECTRONIC DEVICE SUPPORTING THE SAME

CROSS REFERENCE TO RELATED APPLICATIONS

This application is a Continuation application of U.S. patent application Ser. No. 13/961,075 filed on Aug. 7, 2013 which claims the benefit under 35 U.S.C. §119(a) of a Korean patent application filed on Aug. 7, 2012 in the Korean Intellectual Property Office and assigned Serial No. 10-2012-0086419, the entire disclosure of which is hereby incorporated by reference.

BACKGROUND

1. Field of the Invention

The present invention relates generally to a power saving of an electronic device. More particularly, the present invention relates to a method for controlling the power mode of an electronic device to be changed or maintained according to predetermined criteria, and to the electronic device supporting the method.

2. Description of the Related Art

Recently, a great variety of mobile devices has been increasingly popularized. In addition to a traditional call function, mobile devices now have other various functions, such as a digital file player or viewer, a digital camera, a mobile game, and the like.

Meanwhile, most of the mobile devices automatically perform a power mode function for power saving when no input signal is received from a user for a given time. For example, if there is no input signal within a specific time period, the display unit of a mobile device is turned off automatically.

However, in some situations, a power saving function may cause inconveniences. For example, a user may playback e-book contents or video contents that require no input signal for a long time. In this case, although a user intends to continuously view the currently played content, a mobile device may turn off the display unit after no input signal detected for a specified time. As a result, a user must repeat unnecessary manipulation to maintain the viewing mode.

SUMMARY

Accordingly, the present invention is to address the above-mentioned problems and/or disadvantages and to offer at least the advantages described below.

One aspect of the present invention is to provide a method for controlling a power saving mode of an electronic device.

According to one aspect of the present invention, a method for controlling a power mode of an electronic device having a display unit and camera includes: obtaining a current image via the camera when no input event is received on the display within a specified time period during a particular function mode; determining whether the obtained image contains a specific pattern indicative of a human facial feature; and changing the power mode of the electronic device according to the determination outcome.

According to another aspect, the present invention provides an electronic device for supporting a power saving mode which includes: a camera configured to capture an image when no input event is received within a specified time period during an activation of a selected function; and a control unit configured to determine whether the obtained image contains a specific pattern indicative of a human facial feature, and configured to change the power mode of the electronic device according to the determination outcome.

Another aspect of the invention provides a computer program comprising instructions arranged, when executed, to implement a method in accordance with any one of the above-described aspects. A further aspect provides machine-readable storage storing such a program.

According to another aspect of the present invention, a method for controlling a power saving mode of an electronic device having a camera and a display unit includes: obtaining a first image by driving the camera when no input event is received within a first specific time period on the display during a particular function mode; determining whether the first image contains a specific pattern; when the first image contains no specific pattern, operating a first mode of the electronic device; when no further input event is received within a second specific time period on the display unit after the first mode, obtaining a second image through the camera; determining whether the second image contains the specific pattern; when the second image contains the specific pattern, determining whether the specific pattern corresponds to a human face pattern; and when the specific pattern does not correspond to the human face pattern, operating a second mode of the electronic device.

According to still another aspect of the present invention, an electronic device for supporting a power saving mode includes: a camera configured to capture an image when no input event is received within a specified time period during an activation of a selected function; and a control unit configured to, in response to the obtained image containing a specific pattern indicative of a human face, and to, when the specific pattern does not correspond to the human face, activating the power saving mode of the electronic device.

According to the above-discussed method and device, it is possible to automatically control the power saving and/or sleeping mode of a device by recognizing user's face based on a corrected pattern detection.

Embodiments of the present invention allow the power mode of an electronic device to be changed or maintained according to predetermined criteria.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

FIG. 5 and FIG. 6 show exemplary situations in which a power mode control function of an electronic device is applied in accordance with embodiments of the present invention.

DETAILED DESCRIPTION

Exemplary, non-limiting embodiments of the present invention will now be described more fully with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, for the purposes of clarity and simplicity, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1:
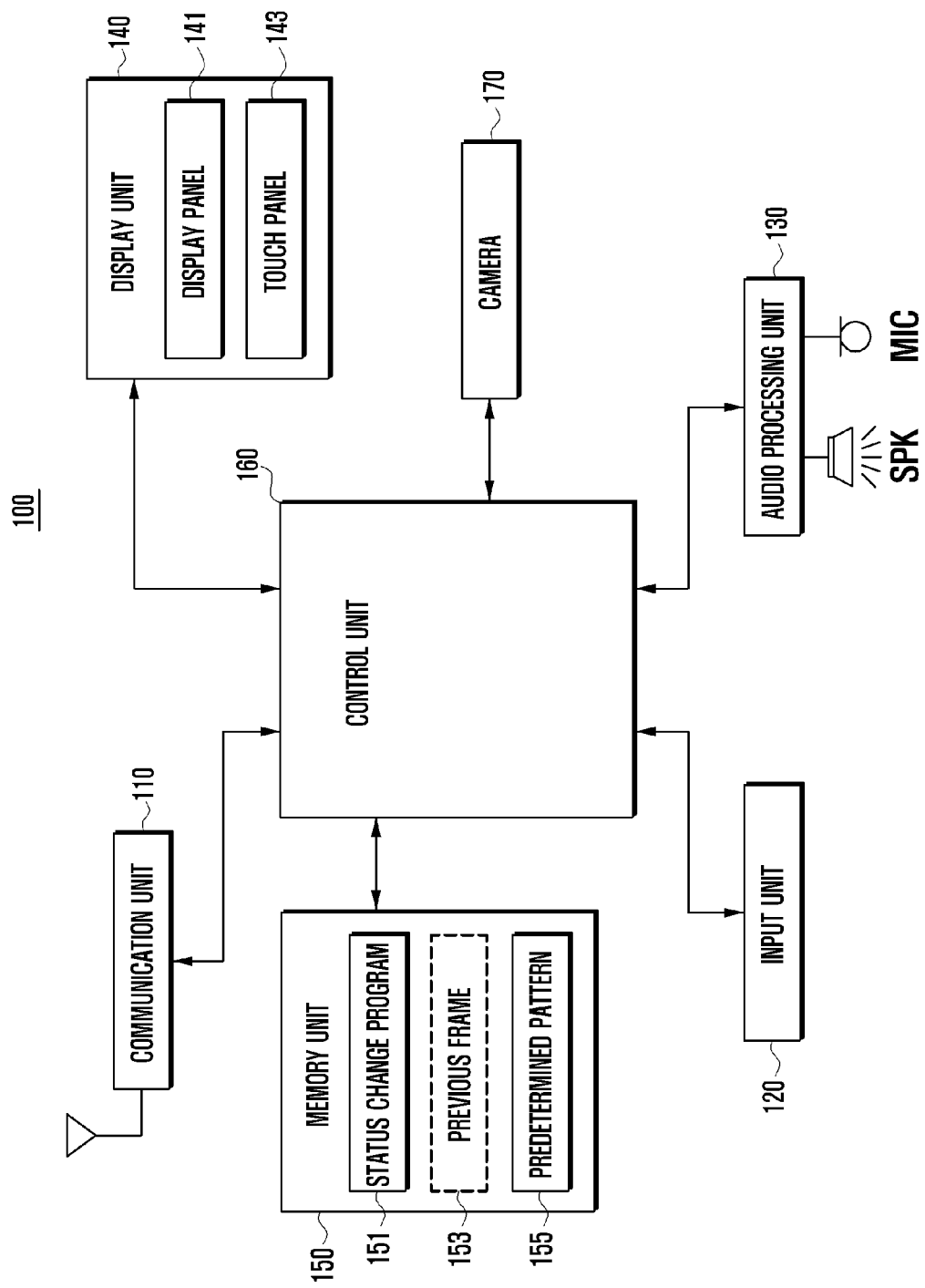
FIG. 1 is a block diagram illustrating an electronic device in accordance with an embodiment of the present invention.

FIG. 1 is a block diagram illustrating an electronic device that supports a power mode control function in accordance with an embodiment of the present invention.

Referring to FIG. 1, the electronic device 100 may include a communication unit 110, an input unit 120, an audio processing unit 130, a display unit 140, a memory unit 150, a control unit 160, and a camera 170.

The electronic device 100 having the above elements may automatically drive the camera 170 and collect an image at a given angle when a particular user function is performed or in a particular mode. Depending on the collected image, the device 100 checks whether a user is using the device 100. If the collected image has no predetermined pattern, the device 100 may determine that a user has no intention of continuously use the device 100, and then perform a power saving operation. If the collected image has a predetermined pattern, the device 100 may determine that a user is continuously using the device 100, and then perform or maintain a related function. Particularly, if images collected at regular intervals are identical with each other or have no movement in the pupil region between the current and previous images, the device 100 may regard it as a situation for power saving mode and therefore perform or activates an automatic power saving mode.

The communication unit 110 is an element that supports a communication function of the device 100. If the device 100 supports no communication function, the communication unit 110 may be removed from the device 100. The communication unit 110 may be used in the form of a mobile communication module so as to support a mobile communication function of the device 100. In this case, the communication unit 110 establishes a communication channel with a mobile communication system and thereby supports signal transmission and reception functions. For example, the communication unit 110 may establish at least one of a voice service channel, a video service channel, and a data service channel with a mobile communication system, and thereby support transmission and reception of specific signals associated with a selected service channel. Particularly, the communication unit 110 may operate in connection with the camera 170. For example, the communication unit 110 may receive, from a specific server or other devices, some patterns which may be regarded as user's face. Alternatively, the face pattern be provided by the electronic device itself using a camera unit 170. The received patterns may be stored in the memory unit 150 under the control of the control unit 160 for later comparison. Meanwhile, the communication unit 110 may be selectively changed from a wakeup mode to a sleep mode or a turn-off mode, based on a collected predetermined pattern. For example, the communication unit 110 which maintains a wakeup mode in connection with a communication function may be changed to non-wakeup mode when an automatic power saving function of this invention is performed. In some embodiments, an automatic power saving operation of this invention may be not applied to a particular user function based on the operation of the communication unit 110, The input unit 120 is an element that creates various input signals required for the operation of the device 100. The input unit 120 may have various input means such as a keyboard, a keypad, key buttons, and the like. If the display unit 140 is implemented with a touch screen, the input unit 120 may be configured in the form of a touch map which is outputted on the touch screen. Particularly, the input unit 120 may create an input signal for turning on or off an automatic power saving function. Additionally, while an automatic power saving function is turned on, the input unit 120 may create various input signals for selectively maintaining the activation of a particular user function, depending on user's manipulation. This input signal is transmitted to the control unit 160 and then converted into a suitable command for performing a relevant function.

The audio processing unit 130 may output various audio data predetermined in connection with the operation of the device 100, audio data by the playback of audio files stored in the memory unit 150, audio data received from the outside, and the like. Additionally, the audio processing unit 130 may support a function of collecting audio data. To this end, the audio processing unit 130 may have a speaker (SPK) and a microphone (MIC). Particularly, if a user function to which an automatic power saving function is applied is activated, the audio processing unit 130 may output a specific sound indicative of an automatic power saving mode. This output may be made in response to a request for activating a relevant user function or at a specific time point during the activation of a relevant user function. Furthermore, the audio processing unit 130 may output a specific sound for informing a user of the process for collecting an image and checking a predetermined pattern indicative of a human face or a particular facial feature, such as pupil, so as to support an automatic power saving operation of this invention during a specific user function. For example, if a given time has elapsed after a specific user function has been performed and if there is no specific pattern in a collected image, the audio processing unit 130 may output a sound, for example, "A current mode is changed because a device is not used". However, such a sound output may be omitted according to user's setting.

Meanwhile, a function to output audio signals through the audio processing unit 130 may be also controlled according to an automatic saving function. For example, if there is no predetermined pattern in an image collected through the camera 170, the audio processing unit 130 may stop the output of audio signals associated with a currently running function. In this case, the audio processing unit 130 may stop an audio function at selected time points under the control of the control unit 160. For example, if the expiration time of a timer is defined in stages, the control unit 160 may adjust the brightness level of the display unit 140 to a minimum brightness level and maintain the audio output function of the audio processing unit 130 at the first expiration time. Thereafter, at the second expiration time after the first expiration time, the control unit 160 may turn off the display unit 140 and stop the audio output function of the audio processing unit 130. At this time, the audio output function may be maintained (e.g., in case of an audio listening function such as a music file playback function) or stopped (e.g., a broadcast listening function) depending on types of user function.

The display unit 140 is an element that offers various screen interfaces required for the operation of the device 100. For example, the display unit 140 outputs an idle screen (or an initial screen), a menu screen (or a home screen), and any other various screens in connection with functions and applications of the device 100. Particularly, the display unit 140 may output a screen associated with activation of a selected user function to which an automatic power saving operation is applied, a screen for selectively applying an automatic power saving function to a user function, a screen for turning on or off an automatic power saving function, and the like.

The display unit 140 may be provided in the form of a touch screen that has an overlap structure of a display panel 141 and a touch panel 143. The display panel 141 may output images, text, and the like corresponding to the above-mentioned various screens. Also, the display unit 140 may output, at a selected position, at least one of an image, text, icon and indicator that indicate whether an automatic power saving mode is applied. For example, if an automatic power saving mode is currently applied, the display panel 141 may output a suitable indicator in an indicator region disposed at the top of screen. Also, the display panel 141 may output an icon for selecting an automatic power saving function and may modify the state of icon depending on whether an automatic power saving function is applied. Namely, an icon that indicates that an automatic power saving function is applied may have different brightness, shape or color in comparison with an icon that indicates that an automatic power saving function is not applied. Additionally, if any input event of a request for a specific user function (e.g., a function to play e-book contents) occurs in a situation that an automatic power saving mode function is activated, the display panel may output, in the form of popup or the like, a message that indicates that an automatic power saving function is applied.

The touch panel 143 may define a valid touch area and an invalid touch area according to types of screen displayed on the display panel 141 and may transmit a touch event occurring in the valid touch area to the control unit 160. Particularly, the touch panel 143 may be activated or not by an automatic power saving mode. For example, if there is a predetermined pattern indicative of a human face in an image collected by the camera 170, the touch panel 143 is activated and may create a touch event based on a touch gesture. If there is no predetermined pattern in the collected image, the touch panel 143 may be not activated.

The memory unit 150 may store an operating system required for the operation of the device 100, applications, algorithms and data in connection with various user functions. Particularly, the memory unit 150 may store a mode change program 151 for supporting an automatic mode change function, and data for supporting the mode change program 151, e.g., a predetermined pattern 155 indicative of a human facial feature, such as pupil, and a previous frame 153.

The mode change program 151 defines a variety of routines associated with an automatic power saving function of this invention. Specifically, the mode change program 151 may have a routine for starting a timer when a specific user function linked to an automatic power saving function is activated, a routine for driving the camera 170 after the timer is started, a routine for collecting an image using the camera 170, a routine for checking whether there is a predetermined pattern in the collected image, and a routine for changing the mode of a currently activated user function depending on the existence of the pattern. The mode change program 151 may further have a routine for inactivating the camera 170 when an image collection is completed or a given time elapses.

Particularly, the mode change program 151 may have an error correction routine for correcting an error caused while an automatic power saving function is applied. In case where any pattern recognized from the collected image is similar to a predetermined pattern, the error correction routine may prevent an unexpected situation that an automatic power saving function is not applied with regard to the pattern. The aforesaid specific user function may be a certain function that is one of various functions provided by the device 100 and that runs based on the communication unit 110, the display unit 140, the audio processing unit 130, or the like. For example, such a user function may be a call function, a content file playback function, a file search function, a web access function, an idle screen output function, a menu screen output function, a broadcast reception function, and the like.

The predetermined pattern 155 is used for analyzing an image collected for supporting an automatic power saving function. Particularly, the predetermined pattern 155 may be a human face recognition pattern, especially, of a device user. Normally the recognition of a human face is based on various factors such as an arrangement of both eyes, an arrangement of the eye and the mouth, a shape of the eye, a size of the pupil, or the like. The predetermined pattern 155 has a pattern value for determining whether a recognized pattern corresponds to a human face, and may further have a pattern value for identifying a specific device user. A pattern value for recognizing a human face may be provided as default at the manufacture of device, downloaded from any service apparatus, or acquired by capturing a user face.

The previous frame 153 is a temporarily stored image frame and is used to correct an error caused while an automatic power saving function is applied. When the camera 170 collects an image to check whether a user is operating the device 100, the previous frame 153 may be acquired from the collected image. Particularly, the previous frame 153 may be an image having a predetermined pattern 155.

The camera 170 is an element that is driven under the control of the control unit 160 and then collects an image of object. The camera 170 may be driven to collect an image after a given time elapses from a specific time point in case where a user function linked to an automatic power saving function is activated or in case where an automatic power saving function is set as default. After collecting an image, the camera 170 may be inactivated again. An image collected by the camera 170 may be transmitted to the control unit 160 and analyzed in connection with an automatic power saving function. This image may be a preview image or still image acquired at a specific time point. When a user function linked to an automatic power saving function is inactivated, an activation control for the camera 170 may be stopped.

The control unit 160 is an element that controls a flow of various signals and a collection and output of information in order to support an automatic power saving function of this invention. For this, the control unit 160 may have configurations shown in FIG. 2.

Figure 2:
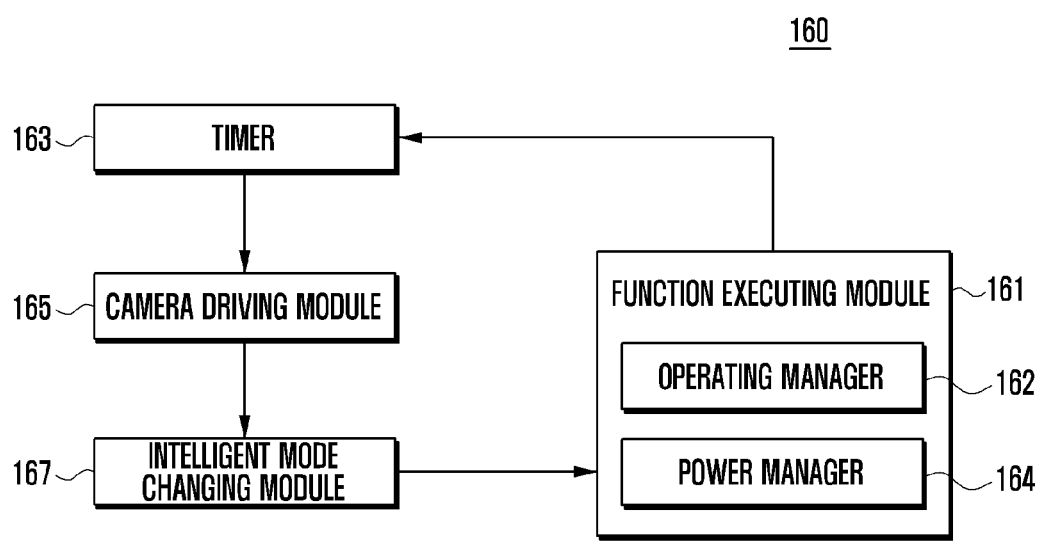
FIG. 2 is a block diagram illustrating a control unit of an electronic device in accordance with an embodiment of the present invention.

FIG. 2 is a block diagram illustrating a control unit of an electronic device in accordance with an embodiment of the present invention.

Referring to FIG. 2, the control unit 160 may include a timer 163, a camera driving module 165, an intelligent mode changing module 167, and a function executing module 161.

The function executing module 161 is an element that controls a signal processing, a data processing and a power supplying so as to perform a user function supported by the device 100. For example, when an input signal for activating the device 100 is generated, the function executing module 161 may control the display of a specific screen on the display unit 140 according to predetermined schedule information. Namely, the function executing module 161 may control an idle screen, a menu screen, or the like to be displayed on the display unit 140. Also, the function executing module 161 may control an e-book play screen, a video file play screen, a music file play screen, a radio function support screen, a web service screen, etc. to be displayed at user's request or according to predetermined schedule information. Further, the function executing module 161 may control the timer 163 to be driven. At this time, the function executing module 161 may differentially control a driving time of the timer 163 according to function types. Namely, for some user functions such as an e-book play function and a video file play function which have a longer operation time, the function executing module 161 may control the timer 163 to have a longer expiration time. Also, for other user functions such as a music file play function and a radio function which have a shorter time for checking the screen during operation, the function executing module 161 may control the timer 163 to have a shorter expiration time.

The function executing module 161 may determine whether to maintain or change a current mode of the device 100, depending on a signal received from the intelligent mode changing module 167. Namely, the function executing module 161 may maintain a current mode of the device 100 when receiving a result of collecting an image having a pattern corresponding to a human face from the intelligent mode changing module 167. Also, the function executing module 161 may change the mode of the device 100 when receiving, from the intelligent mode changing module 167, a result of collecting an image having no pattern corresponding to a human face, a result of collecting an image having the same pattern as the previous frame 153, or a result of collecting a stationary image.

The function executing module 161 may include an operating manager 162 and a power manager 164. The operating manager 162 is an element that manages a function related to a user function control. Namely, the operating manager 162 supports the activation of a selected user function according to user's input or predetermined schedule information. Also, the operating manager 162 may support the operation of a selected user function according to an input signal received from the input unit 120 or the display unit 140 having an input function. Meanwhile, the operating manager 162 may support different processing for a currently operating user function when the mode is changed according to the activation of an automatic power saving function. For example, if a request for a mode change is received from the intelligent mode changing module 167 during the operation of a selected user function, the operating manager 162 may control the user function to be changed to a pause mode or a function stop mode. At this time, the operating manager 162 may support differently a control of user function according to the type of activated user function. For example, when a request for a mode change is received during the execution of a video playback function, the operating manager 162 may control a video to pause. Then, when an additional request for a mode change is received from the intelligent mode changing module 167, the operating manager 162 may control the video to be stopped. Meanwhile, the operating manager 162 may control a communication channel, formed for a communication function such as a web access, to be disconnected when a request for a mode change is received during the execution of a web access function, and may further control the communication function to be disabled to stop the output of a web page when an additional request for a mode change is received. Additionally, even though a request for a mode change is received during the execution of a specific user function such as a music file play function, the operating manager 162 may maintain the operation.

The power manager 164 is an element that controls a power saving mode of the display unit 140, depending on whether an automatic power saving function is applied or not. Namely, when a request for a mode change is received from the intelligent mode changing module 167, the power manager 164 may change a current mode of the display unit 140. For example, the power manager 164 may support a screen output of the display unit 140 based on a predetermined first brightness level and, when a signal for requesting a mode change is received from the intelligent mode changing module 167, may control the power supply such that the display unit 140 displays based on a second brightness level smaller than the first brightness level. Then, if a signal for an additional mode change request is received, the power manager 164 may control the power supply to be stopped to the display unit 140. Meanwhile, if any input event for manipulating the device 100 occurs within a given time after a display at the second brightness, or if a specific input event occurs after a stop of supply of power to the display unit 140, the power manager 164 may control the display unit 140 to be displayed again at the first brightness level.

The timer 163 is an element that is initiated by means of the control of the function executing module 161 and transmits an expiration signal to the camera 165. The timer 163 may be started when a specific user function is activated by the function executing module 161, and supports a count function for a predetermined time period. Namely, the timer 163 may be turned on in response to the activation of a selected user function by the function executing module 161 and may be reset in response to a suitable input event. The timer 163 may be formed of two or more timers and operate based on two or more expiration times. Namely, if an automatic power saving function of this invention is applied step by step, the timer 163 may be formed of several timers having different expiration times and notify the camera driving module 165 of the respective expiration times. Alternatively, the timer 163 may have several expiration times and send each expiration time to the camera driving module 165. Such expiration time may be applied in common to the whole user functions or applied differently to the respective individual user functions.

The camera driving module 165 is an element that receives the expiration time from the timer 163 and controls the camera 170 according to the expiration time. Namely, at the expiration time set by the timer 163, the camera driving module 165 drives the camera 170 to obtain an image such as a preview image, a still image, or any other type image. For supporting an automatic power changing mode, the camera driving module 165 may control the camera 170 to collect a preview image for a given time only or collect a specific still image. The collected preview image or still image may be transmitted to the intelligent mode changing module 167.

The intelligent mode changing module 167 is an element that checks whether a human face is captured by analyzing an image received from the camera driving module 165 and then transmits check results to the function executing module 161. For this, the intelligent mode changing module 167 may refer to the predetermined pattern 155 stored in the memory unit 150. Namely, the intelligent mode changing module 167 may perform a face recognition for images contained in the obtained preview or still image and then checks whether the images have a subject corresponding to a human face. At this time, the intelligent mode changing module 167 may check whether a specific pattern corresponding to the predetermined pattern 155 is detected from the images. If any pattern corresponding to the predetermined pattern 155 is detected, the intelligent mode changing module 167 may transmit the existence of a corresponding pattern to the function executing module 161. If there is no pattern corresponding to the predetermined pattern 155 is detected, the intelligent mode changing module 167 may transmit the nonexistence of a corresponding pattern to the function executing module 161.

Meanwhile, for error correction, the intelligent mode changing module 167 may check whether a specific pattern in the obtained image corresponds to a human face. For this, if there is a pattern corresponding to the predetermined pattern 155 in the collected image, the intelligent mode changing module 167 may compare the pattern with the previous frame 153. For this comparison, the intelligent mode changing module 167 may control the memory unit 150 to store in advance the previous frame 153 having a pattern similar or identical to the predetermined pattern 155 indicative of a human facial feature. If a currently obtained image contains any pattern substantially similar or identical to the predetermined pattern 155, the intelligent mode changing module 167 may check whether a currently obtained frame is identical to the previous frame 153. For example, the pupil which is a hole located in the center of the iris of the eye that allows light to enter the retina tends to move during viewing mode. Thus, it is determine whether the pupil between a current image and a previous image has moved. However, it should be noted that other parts of the facial features such as a noise, ears, lips, etc. can be detected for its movement between images to determine whether to activate the power saving mode in according to the teaching of the present invention. If so, the intelligent mode changing module 167 may transmit the obtained frame having a pattern identical to the previous frame 153 to the function executing module 161. Namely, if any pattern corresponding to a human face is detected from a currently obtained image frame, the intelligent mode changing module 167 stores the obtained frame as the previous frame 153. Then, if any image frame is further obtained after a given time, the intelligent mode changing module 167 may check whether the further obtained image is identical to the previous frame 153, and may determine that the recognized pattern is a specific pattern corresponding to the predetermined pattern 155 rather than a human face.

Additionally, the intelligent mode changing module 167 may compare preview images at intervals and, if any image containing a pattern is obtained, may check whether there is a movement of the pattern. If the pattern contained in the currently obtained image has a certain movement, for example, pupil movement, the intelligent mode changing module 167 may determine that the current image corresponds to a human face, and then may transmit the determination result to the function executing module 161. If there is no movement, the intelligent mode changing module 167 may determine that the current image corresponds to other subject rather than a human face, and then may transmit the determination result to the function executing module 161.

As discussed above, after a specific user function is activated, the device 100 of this invention collects an image, determines whether a user is using the device 100 by checking whether the collected image contains a pattern corresponding to the predetermined pattern 155, and then determines whether to change or maintain a current mode. Namely, depending on checking whether a recognized image is a human face, the device 100 determines whether to perform an automatic power saving operation. If any pattern (e.g., clothes, wallpaper, ceiling, etc.) such as similar to, but not identical to, a human face is recognized, the device 100 may perform a power saving mode to prevent unnecessary power consumption.

Figure 3:
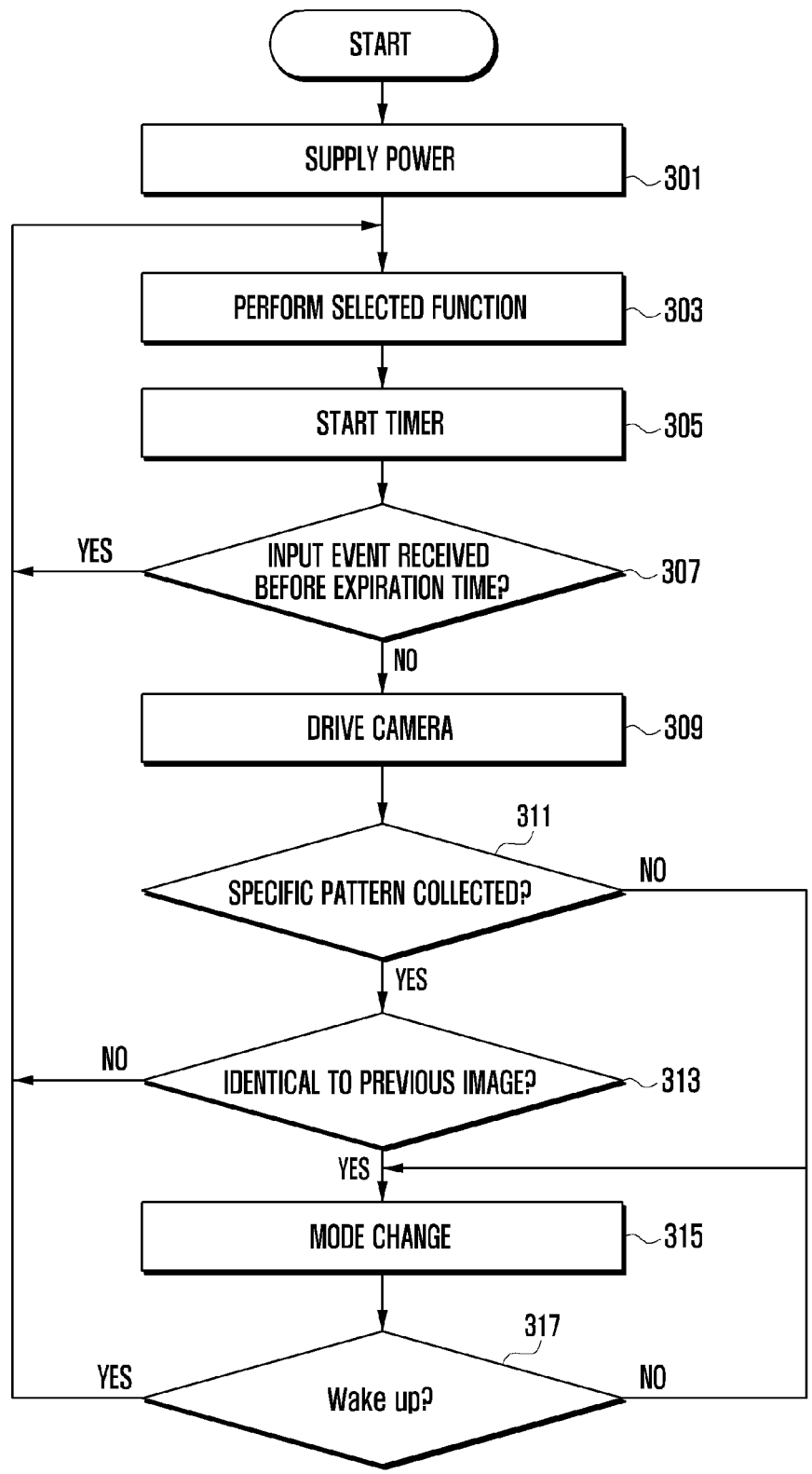
FIG. 3 is a flow diagram illustrating a power mode control method of an electronic device in accordance with an embodiment of the present invention.

FIG. 3 is a flow diagram illustrating a power saving control method of an electronic device in accordance with an embodiment of the present invention.

Referring to FIG. 3, at step 301, the control unit 160 supplies electric power to the respective elements of the device 100. Then, at step 303, the control unit 160 performs a particular function according to predefined schedule information or received input event. For example, the control unit 160 may output a predefined specific screen such as an idle screen, a menu screen or a lock screen on the display unit 140. Also, depending on user's request, the control unit 160 may output an execution screen of a selected user function such as a file play screen, a web access screen, a file search screen, a file edit screen, or the like on the display unit 140.

Once a particular function is performed, the control unit 160 starts at step 305 the timer 163 having a predetermined expiration time. This expiration time of the timer 163 may be defined as a default or varied according to user's setting. Alternatively, the expiration time of the timer 163 may be automatically varied according to the type of a currently executed user function. For example, if an idle screen, a menu screen, a file search screen, or the like is outputted on the display unit 140, the expiration time of the timer 163 may be set to a predetermined first time. If a file play screen, a file edit screen, or the like is outputted on the display unit 140, the expiration time of the timer 163 may be set to a second time greater than the first time.

Next, at step 307, the control unit 160 checks whether any input event is received before the expiration of the timer 163. At this step, an input event may be a touch event occurring on the touch panel 143, an input signal created by the input unit 120, an input event received from any external entity, and the like. If such an input event is received, the control unit 160 returns to previous step 303 and then, at step 305, resets and restarts the timer 163.

Meanwhile, if there is no input event before the expiration of the timer 163 at step 307, the control unit 160 drives the camera 170 at step 309. Namely, the control unit 160 turns on the camera 170 and controls the camera 170 to obtain an image at a given angle. At this time, the obtained image may be a preview image, a still image, or a moving image which allows checking whether a pattern corresponding to a human facial feature is contained.

Next, at step 311, the control unit 160 determines whether the obtained image contains a specific pattern. Namely, the control unit 160 checks whether there is a specific pattern corresponding to a human face. If a specific pattern is contained in the obtained image, the control unit 160 further determines at step 313 whether the obtained image is substantially identical to a previous image. For this, the control unit 160 may compare at least parts of the previous image with at least parts of the currently obtained image. For example, in order to check identity, the control unit 160 may compare a selected region having a specific pattern in the previous image with a corresponding region having a specific pattern in the current image.

If the currently obtained image is not substantially identical to the previous image at step 313, the control unit 160 determines that a user is continuously using the device 100, and then returns to step 303. If the currently obtained image is substantially identical to the previous image at step 313, the control unit 160 controls a power saving mode of the device 100 at step 315. Also, if the currently obtained image fails to contain a specific pattern at step 311, the control unit 160 may control a mode change at step 315. As discussed above, a mode change may include adjusting the brightness of a display unit 140, turning off the display unit 140, entering into a sleep mode of the device 100, or pausing or stopping a currently activated function. Thereafter, at step 317, the control unit 160 checks whether any input signal for waking up the terminal 100 is received. If there is no wakeup signal, the control unit 160 maintains step 315. However, if a wakeup signal is received, the control unit 160 returns to step 303 and repeats the aforesaid process.

Figure 4:
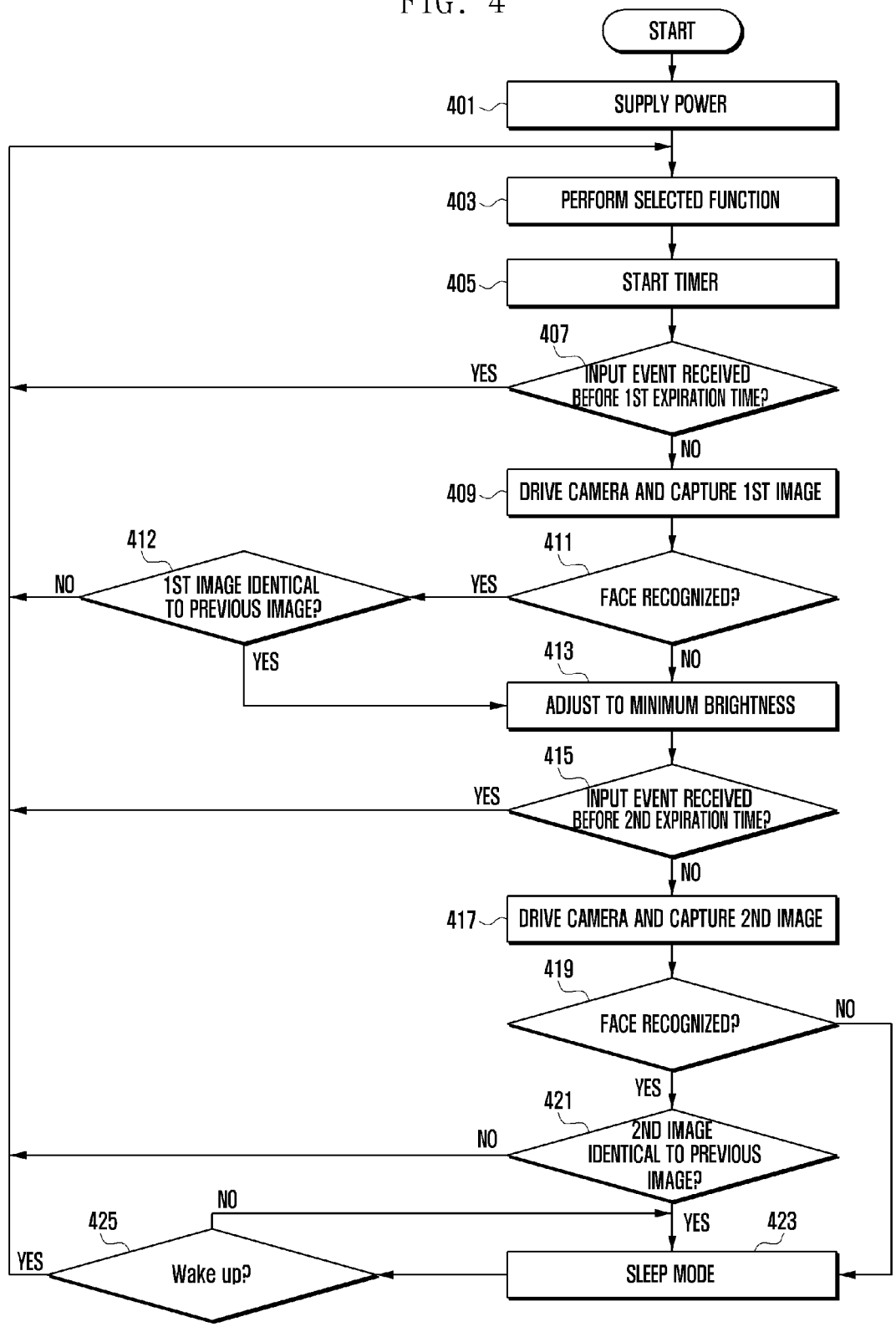
FIG. 4 is a flow diagram illustrating a power mode control method of an electronic device in accordance with another embodiment of the present invention.

FIG. 4 is a flow diagram illustrating a mode change control method of an electronic device in accordance with another embodiment of the present invention.

Referring to FIG. 4, at step 401, the control unit 160 supplies electric power to the respective elements of the device 100, and at step 403, performs a particular function according to predefined schedule information or received input event. Then, at step 405, the control unit 160 starts the timer 163 to perform an automatic power saving function.

Next, at step 407, the control unit 160 checks whether an input event is received before a predefined first expiration time of the timer 163. If there is an input event before the first expiration time, the control unit 160 returns to step 403 to reset and restart the timer 163.

Meanwhile, if there is no input event before the first expiration time at step 407, the control unit 160 drives the camera 170 at step 409 to obtain an image. Then, at step 411, the control unit 160 performs face recognition for the image obtained by the camera 170. At this step, the control unit 160 may temporarily drive the camera 170 and then obtain a preview image for a predefined time or obtain at least one image frame so as to check whether any subject for face recognition is positioned within a camera angle. Then, the control unit 160 may stop the camera 170 after the predefined time elapsed or after the image frame is obtained.

Additionally, at this step, the control unit 160 may temporarily store the obtained image in the memory unit 150 and encrypt the obtained image. Further, when a selected user function to which an automatic power saving function is applied is performed, the device 100 may inform a user through text or sounds at a certain time point that his or her face or any subject positioned within a camera angle may be taken.

Meanwhile, if the currently obtained image contains a face-recognizable region at step 411, the control unit 160 determines at step 412 whether the image is substantially identical to the previous image. Namely, the control unit 160 checks whether the currently obtained image is identical to the previous image on the basis of a capturing angle, a captured subject, and the like. For example, the control unit 160 determines where there is a movement in pupil between the images. Thus, if the pupil in the current image is not identical to the position of the pupil in the previous image, the control unit 160 returns to step 403 to reset and restart the timer 163.

If the currently obtained image contains no face-recognizable features at step 411, or if the currently obtained image is identical to the previous image, for example, when the pupil position between the images is the same, the control unit 160 performs a first power saving control at step 413. For example, at this step, the control unit 160 may adjust the brightness of the display unit 140 to a predetermined brightness, e.g., the minimum brightness. Namely, the control unit 160 may control the display unit 140 to enter into a dimming mode by regulating power supplied to the display unit 140. Additionally or alternatively, the control unit 160 may change a mode of a currently activated user function. For example, the control unit 160 may pause a currently played or executed file. However, if a user function is a specific function such as an audio listening function, the control unit 160 may maintain a current mode of the user function.

Meanwhile, although step 411 is described as case of face recognition, specific pattern recognition may be alternatively performed as discussed earlier in FIG. 3. Namely, the control unit 160 may examine whether a specific pattern which can be considered as a part of face is contained in the obtained image, and if so, may regard this case as face recognition. Then the control unit 160 may check whether the specific pattern is identical to a pattern in the previous image. Namely, the control unit 160 may determine whether the specific pattern is actually at least parts of a face or similar to, but not identical to, a human face.

Next, at step 415, the control unit 160 checks whether an input event is received before a predefined second expiration time of the timer 163. If there is an input event before the second expiration time, the control unit 160 returns to step 403 to reset and restart the timer 163. Meanwhile, if there is no input event before the second expiration time at step 415, the control unit 160 drives the camera 170 at step 417 to obtain again an image. Then, at step 419, the control unit 160 checks whether the obtained image contains a face-recognizable region. If at least parts of a face-recognizable region are contained in the image, the control unit 160 determines at step 421 whether the image is identical to the previous image. The previous image corresponds to the previous frame 153 of FIG. 1. The previous frame may be acquired from the collected image so the first image captured at stage 409 could be used as the previous image at stage 421.

This step 421 may be to perform only an identity comparison of images without checking whether a specific pattern indicative of a facial feature is contained. Meanwhile, as discussed above, this step may be to check whether a predefined specific pattern is contained. In this case, step of checking the identity of images may be to check the identity of position or shape of a specific pattern.

If the currently obtained image is identical to the previous image at step 421, the control unit 160 returns to step 403. For example, the control unit 160 may return the brightness of the display unit to an original brightness or maintain a previously performed function. If the currently obtained image is not identical to the previous image at step 421, or if the currently obtained image contains no face-recognizable feature, the control unit 160 performs a second power saving control at step 423. For example, at this step, the control unit 160 may control the device 100 to enter into a sleep mode in which the display unit 140 is turned off. Also, in a sleep mode, the control unit 160 may be supplied with the minimum power, e.g., required for a communication module and a wakeup module that includes circuitry for waking up the control unit. Thereafter, the control unit 160 checks at step 425 whether an input signal for waking up the device is received, and then returns to step 403 or maintains a sleep mode.

FIGS. 5 and 6 show exemplary situations in which a power saving control function of an electronic device is applied in accordance with embodiments of the present invention.

Referring first to FIG. 5, when a user uses a selected user function, the device 100 may control the display unit 140 to output a screen with a predefined brightness. If no input signal is received from the touch panel 143 or the input unit 120 for a given time, the device 100 drives the camera 170 to capture an image. Namely, after a selected user function is activated at step 501 and then a given time (i.e., N sec) elapses, the device 100 drives the camera 170 and obtains an image within a camera angle. This image may contain user's eye or face. The control unit 160 analyzes the obtained image and checks whether a specific pattern corresponding to the predetermined pattern 155 such as a human eye or face is contained. If so, the control unit 160 maintains a turn-on state of the display unit 140 as shown at step 503.

Meanwhile, referring to FIG. 6, after a selected user function is activated at step 601 and then a given time (i.e., N sec) elapses, the device 100 drives the camera 170 and obtains an image having a certain pattern. Then the control unit 160 analyzes the pattern in the obtained image and checks whether the pattern is identical to that in the previous image. If identical, the control unit 160 activates an automatic power saving mode function of the device as shown at step 603. For example, if there is no pupil movement between the previous and current images, the terminal determines that the mobile user is not viewing the content displayed in the display panel as viewing requires a movement of pupil in human eyes.

As discussed above, the electronic device 100 that supports the implementation of power control method thereof may automatically adjust the brightness of the display unit 140 or change an activation of a user function after a given time elapses without any input signal, depending on whether a specific pattern is contained in a captured image. Normally when a user watches the screen of the device 100, his or her pupil tends to slightly move. Therefore, if the captured image is not a human face, or if the specific pattern contained in the captured image has no movement, the device 100 determines that a user is not using a user function, and therefore performs an automatic power saving function for power saving. However, if the captured image is a human face, and if the specific pattern contained in the captured image has a movement, the device 100 determines that a user is using a user function, and therefore performs no automatic power saving function.

Meanwhile, a power saving control step may include adjusting the brightness of the display unit, changing a turn-on mode of the display unit to a turn-off mode, entering into a sleep mode, pausing or stopping a currently activated user function, and the like. Additionally, such a mode change step may include readjusting the brightness of the display unit to a previous brightness, changing the turn-off mode of the display unit to the turn-on mode, exiting from the sleep mode, activating again the paused or stopped user function, and the like.

Further, in the above-discussed method, steps 311 and 313 in FIG. 3 may be changed in their order. Similarly, steps 411 and 412 and/or steps 419 and 421 in FIG. 4 may be changed in their order.

According to a digital convergence tendency today, the mobile device 100 may essentially or selectively further include any other elements such as a short-range communication module, a wired or wireless interface, an Internet communication module, a broadcast receiver module, and a GPS module. As will be understood by those skilled in the art, some of the above-mentioned elements in the mobile device 100 may be omitted or replaced with another.

Additionally, the mobile device 100 of this invention may include any types of electronic devices. For instance, the mobile device 100 may include portable devices, multimedia players and their application equipment, especially including mobile communication terminals based on various communication protocols, a portable multimedia player (PMP), a digital broadcasting player, a personal digital assistant (PDA), a music player (e.g., an MP3 player), a portable game console, a smart phone, a notebook, a handheld PC, and the like.

The present invention is described herein with reference to flowchart illustrations of user interfaces, methods, and computer program products according to embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

While this invention has been particularly shown and described with reference to an exemplary embodiment thereof, it will be understood by those skilled in the art that various changes in form and details may be made therein without departing from the scope of the invention as defined by the appended claims.

It will be appreciated that embodiments of the present invention can be realized in the form of hardware, software or a combination of hardware and software. Any such software may be stored in the form of volatile or non-volatile storage, for example a storage device like a ROM, whether erasable or rewritable or not, or in the form of memory, for example RAM, memory chips, device or integrated circuits or on an optically or magnetically readable medium, for example a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments provide a program comprising code for implementing apparatus or a method as claimed in any one of the claims of this specification and a machine-readable storage storing such a program. Still further, such programs may be conveyed electronically via any medium, for example a communication signal carried over a wired or wireless connection and embodiments suitably encompass the same.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith.

What is claimed is:

1. An apparatus comprising:
a touch screen;
a camera; and
a processor configured to:
operate the apparatus with the camera turned off;
turn on the camera based at least in part on a determination that no input has been received with respect to the apparatus for a specified period of time during the operation;
obtain an image using the camera;
determine whether the image includes information corresponding to a human facial feature;
change a brightness of the touch screen based at least in part on a determination that the image does not include the information corresponding to the human facial feature;
obtain another image with the camera based at least in part on a determination that no input has been received with respect to the apparatus for another specified period; and
enter a sleep mode based at least in part on a determination that the another image does not include the information corresponding to the human facial feature.

2. The apparatus of claim 1, wherein the processor is configured to:
perform the turning on the camera further based on a determination that a specified application is being executed.

3. The apparatus of claim 1, wherein the processor is configured to:
perform the turning on the camera further based on a determination that a call application, a web application, a content playback application, a file search application, or a broadcast reception application is being executed.

4. The apparatus of claim 1, wherein the processor is configured to:
select a first specified period of time or a second specified period of time as the specified period of time in response to an input from a user corresponding to the apparatus.

5. The apparatus of claim 1, wherein the processor is configured to:
turn off the camera after obtaining the image.

6. The apparatus of claim 1, wherein the information represents an arrangement, a shape, or a size of one or more eyes, a mouth, or a pupil.

7. The apparatus of claim 1, wherein the processor is configured to:
change, as at least part of performing a specified function, an operational state of the touch screen, content displayed via the touch screen, or a state of a connection with an external electronic device providing the content.

8. The apparatus of claim 1, wherein the processor is configured to:
display, via the touch screen, a notification indicating a state of the camera.

9. The apparatus of claim 1, wherein the processor is configured to:
refrain from performing a specified function based at least in part on a determination that the image includes the information corresponding to the human facial feature.

10. The apparatus of claim 1, further comprising a communication module, wherein the processor is configured to:
receive, using the communication module, at least part of the information from an external electronic device.

11. An apparatus comprising:
a touch screen;
a camera; and
a processor configured to:
operate the apparatus with the camera turned off;
determine that a specified period of time has passed since the operation;
turn on the camera based at least in part on the determining outcome;
obtain an image using the camera;
determine whether the image includes information corresponding to a human facial feature;
change a brightness of the touch screen based at least in part on a determination that the image does not include the information corresponding to the human facial feature; and
when no input is received during another specified period of time, enter a sleep mode based at least in part on a determination that another image obtained using the camera does not include the information corresponding to the human facial feature.

12. The apparatus of claim 11, wherein the processor is configured to:

perform the turning on the camera further based on a determination that an input has not been received with respect to the apparatus during the specified period of time.

13. The apparatus of claim 11, wherein the processor is configured to:
activate a timer to measure the specified period of time based at least in part on a determination that a specified application is executed.

14. The apparatus of claim 11, wherein the processor is configured to:
turn off the camera after obtaining the image.

15. The apparatus of claim 11, wherein the processor is configured to:
refrain from performing a specified function based at least in part on a determination that the image includes the information corresponding to the human facial feature.

16. A non-transitory machine-readable storage device storing instructions that, when executed by one or more processors, cause the one or more processors to perform operations comprising:
operating, at an electronic device including a touch screen and a camera, the electronic device with the camera turned off;
determining that no input has been received with respect to the electronic device for a specified period of time during the operating;
turning on the camera based at least in part on the determining;
changing a brightness of the touch screen based at least in part on a determination that an image does not include information corresponding to a human facial feature;
obtaining another image with the camera based at least in part on a determination that no input has been received with respect to the electronic device for another specified period; and
entering a sleep mode based at least in part on a determination that the another image does not include the information corresponding to the human facial feature.

17. The non-transitory machine-readable storage device of claim 16, wherein the turning comprises:
performing the turning on the camera is further based on a determination that a specified application is being executed.

18. The non-transitory machine-readable storage device of claim 16, the operations further comprising:
obtaining an image using the camera;
determining whether the image includes the information corresponding to a human facial feature; and
performing a specified function based at least in part on a determination that the image does not include the information corresponding to the human facial feature.

19. The non transitory machine-readable storage device of claim 18, the operations further comprising:
refraining from performing the specified function based at least in part on a determination that the image includes the information corresponding to the human facial feature.

20. The apparatus of claim 1, wherein the processor is configured to turn off the camera after obtaining the image when the image does not include the information corresponding to a human facial feature.

* * * * *